(12) United States Patent
Toh

(10) Patent No.: US 8,068,016 B2
(45) Date of Patent: Nov. 29, 2011

(54) METHOD AND SYSTEM FOR DISSEMINATING WITNESS INFORMATION IN MULTI-HOP BROADCAST NETWORK

(75) Inventor: Chai Keong Toh, Irvine, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 435 days.

(21) Appl. No.: 12/365,265

(22) Filed: Feb. 4, 2009

(65) Prior Publication Data

US 2010/0194558 A1    Aug. 5, 2010

(51) Int. Cl.
*B60Q 1/00* (2006.01)

(52) U.S. Cl. ........... 340/425.5; 340/905; 340/436; 340/539.1; 340/995.13; 340/902

(58) Field of Classification Search .............. 340/902, 340/905, 436, 539.1, 995.13, 425.5; 701/117–119
See application file for complete search history.

(56) References Cited

U.S. PATENT DOCUMENTS

| | | | | |
|---|---|---|---|---|
| 5,270,708 A * | 12/1993 | Kamishima | ............ | 340/995.24 |
| 5,317,311 A * | 5/1994 | Martell et al. | ............ | 340/905 |
| 5,428,544 A * | 6/1995 | Shyu | ............ | 701/117 |
| 5,699,056 A * | 12/1997 | Yoshida | ............ | 340/905 |
| 5,818,356 A * | 10/1998 | Schuessler | ............ | 340/995.12 |
| 5,831,552 A * | 11/1998 | Sogawa et al. | ............ | 340/995.27 |
| 5,864,305 A * | 1/1999 | Rosenquist | ............ | 340/905 |
| 5,910,766 A * | 6/1999 | Evans | ............ | 340/426.19 |
| 5,969,598 A * | 10/1999 | Kimura | ............ | 340/436 |
| 6,012,012 A * | 1/2000 | Fleck et al. | ............ | 701/117 |
| 6,130,626 A * | 10/2000 | Kane et al. | ............ | 340/905 |
| 6,178,374 B1 * | 1/2001 | Mohlenkamp et al. | ............ | 701/117 |
| 6,211,777 B1 * | 4/2001 | Greenwood et al. | ............ | 340/436 |
| 6,255,963 B1 * | 7/2001 | Heimann et al. | ............ | 340/905 |
| 6,317,682 B1 * | 11/2001 | Ogura et al. | ............ | 701/117 |
| 6,324,393 B1 * | 11/2001 | Doshay | ............ | 455/404.2 |
| 6,385,539 B1 * | 5/2002 | Wilson et al. | ............ | 701/213 |
| 6,401,027 B1 * | 6/2002 | Xu et al. | ............ | 701/117 |
| 6,459,988 B1 * | 10/2002 | Fan et al. | ............ | 701/213 |
| 6,466,139 B1 * | 10/2002 | Schmidt | ............ | 340/905 |
| 6,590,507 B2 * | 7/2003 | Burns | ............ | 340/995.13 |
| 6,615,137 B2 * | 9/2003 | Lutter et al. | ............ | 701/301 |
| 6,617,979 B2 * | 9/2003 | Yoshioka | ............ | 340/901 |
| 6,690,291 B1 * | 2/2004 | Cardillo et al. | ............ | 340/901 |
| 6,750,785 B2 * | 6/2004 | Trajkovic et al. | ............ | 340/901 |
| 6,765,495 B1 * | 7/2004 | Dunning et al. | ............ | 340/903 |
| 6,862,524 B1 * | 3/2005 | Nagda et al. | ............ | 701/209 |
| 6,865,480 B2 * | 3/2005 | Wong | ............ | 701/210 |
| 6,954,135 B1 * | 10/2005 | Yoshioka et al. | ............ | 340/5.72 |
| 6,985,089 B2 * | 1/2006 | Liu et al. | ............ | 340/903 |
| 7,027,773 B1 * | 4/2006 | McMillin | ............ | 455/41.2 |
| 7,092,723 B2 * | 8/2006 | Himmelstein | ............ | 455/456.1 |
| 7,271,736 B2 * | 9/2007 | Siegel et al. | ............ | 340/902 |
| 7,379,876 B2 * | 5/2008 | Nakata | ............ | 704/275 |
| 7,397,351 B1 * | 7/2008 | Rubin et al. | ............ | 340/435 |

(Continued)

*Primary Examiner* — Benjamin C Lee
*Assistant Examiner* — Quang D Pham
(74) *Attorney, Agent, or Firm* — Dirk Brinkman; Gene Vinokur

(57) ABSTRACT

Information related to a vehicular environment is disseminated in a multi-hop broadcast network of nodes. Vehicles and roadside units are equipped with the nodes. An event is sensed at a location by a source node. In response, zones are associated with respect to the location of the source node. Each zone is logically asymmetric and disjoint from the other zones. An alert message is broadcast, received, and then rebroadcast by other vehicles according to the locations of the vehicles in the zones. The nodes can also disseminate witness information.

11 Claims, 16 Drawing Sheets

U.S. PATENT DOCUMENTS

| | | | |
|---|---|---|---|
| 7,420,954 B2* | 9/2008 | Elbatt et al. | 370/338 |
| 7,427,929 B2* | 9/2008 | Bauer et al. | 340/905 |
| 7,430,218 B2* | 9/2008 | Lee et al. | 370/464 |
| 7,463,138 B2* | 12/2008 | Pawlicki et al. | 340/435 |
| 7,466,664 B2* | 12/2008 | Ghosh et al. | 370/254 |
| 7,689,230 B2* | 3/2010 | Spadafora et al. | 455/456.1 |
| 7,772,996 B2* | 8/2010 | Burns | 340/991 |
| 7,885,829 B2* | 2/2011 | Danico et al. | 705/4 |
| 2002/0107637 A1* | 8/2002 | Okamura et al. | 701/301 |
| 2002/0120455 A1* | 8/2002 | Nakata | 704/275 |
| 2002/0128766 A1* | 9/2002 | Petzold et al. | 701/201 |
| 2002/0145541 A1* | 10/2002 | Matsui et al. | 340/934 |
| 2003/0014187 A1* | 1/2003 | Chun et al. | 701/209 |
| 2003/0067380 A1* | 4/2003 | Bedi et al. | 340/5.72 |
| 2003/0091010 A1* | 5/2003 | Garahi et al. | 370/338 |
| 2003/0112133 A1* | 6/2003 | Webb et al. | 340/436 |
| 2003/0130794 A1* | 7/2003 | Miller et al. | 701/201 |
| 2003/0139871 A1* | 7/2003 | Miller et al. | 701/96 |
| 2003/0139881 A1* | 7/2003 | Miller et al. | 701/301 |
| 2003/0139882 A1* | 7/2003 | Miller et al. | 701/301 |
| 2004/0030587 A1* | 2/2004 | Danico et al. | 705/4 |
| 2004/0061600 A1* | 4/2004 | Wehner et al. | 340/435 |
| 2004/0150534 A1* | 8/2004 | Linn | 340/995.13 |
| 2004/0215373 A1* | 10/2004 | Won et al. | 701/1 |
| 2005/0002347 A1* | 1/2005 | Lee et al. | 370/312 |
| 2005/0088318 A1* | 4/2005 | Liu et al. | 340/902 |
| 2005/0216184 A1* | 9/2005 | Ehlers | 701/200 |
| 2005/0286456 A1* | 12/2005 | McNew et al. | 370/312 |
| 2006/0082472 A1* | 4/2006 | Adachi et al. | 340/995.13 |
| 2006/0192687 A1* | 8/2006 | Konishi et al. | 340/901 |
| 2007/0149214 A1* | 6/2007 | Walsh et al. | 455/456.1 |
| 2007/0150140 A1* | 6/2007 | Seymour | 701/35 |
| 2007/0198168 A1* | 8/2007 | Nathan et al. | 701/117 |
| 2007/0223702 A1* | 9/2007 | Tengler et al. | 380/270 |
| 2008/0002573 A1* | 1/2008 | Mosko et al. | 370/229 |
| 2008/0059050 A1* | 3/2008 | Lin et al. | 701/117 |
| 2008/0082261 A1* | 4/2008 | Tengler et al. | 701/210 |
| 2008/0186206 A1* | 8/2008 | Reumerman | 340/902 |
| 2008/0234925 A1* | 9/2008 | Lo | 701/201 |
| 2008/0316055 A1* | 12/2008 | Bachelder et al. | 340/906 |
| 2009/0027176 A1* | 1/2009 | Yulevich | 340/425.5 |
| 2009/0045977 A1* | 2/2009 | Bai et al. | 340/905 |
| 2009/0072997 A1* | 3/2009 | Shrum, Jr. | 340/905 |
| 2009/0176511 A1* | 7/2009 | Morrison | 455/456.3 |
| 2009/0176512 A1* | 7/2009 | Morrison | 455/456.6 |
| 2009/0209233 A1* | 8/2009 | Morrison | 455/411 |
| 2009/0226001 A1* | 9/2009 | Grigsby et al. | 381/77 |
| 2009/0231432 A1* | 9/2009 | Grigsy et al. | 348/149 |
| 2009/0233575 A1* | 9/2009 | Morrison | 455/404.2 |
| 2009/0233633 A1* | 9/2009 | Morrison | 455/466 |
| 2009/0309757 A1* | 12/2009 | Mudalige et al. | 340/905 |
| 2010/0019932 A1* | 1/2010 | Goodwin | 340/902 |
| 2010/0060480 A1* | 3/2010 | Bai et al. | 340/901 |
| 2010/0069093 A1* | 3/2010 | Morrison | 455/456.3 |
| 2010/0194592 A1* | 8/2010 | Yim et al. | 340/905 |

* cited by examiner

METHOD AND SYSTEM FOR DISSEMINATING WITNESS INFORMATION IN MULTI-HOP BROADCAST NETWORK

RELATED APPLICATION

This application is related to, U.S. Non-Provisional patent application Ser. No. 12/365,733, "Method and System for Disseminating Vehicle and Road Related Information in Multi-Hop Broadcast Networks," filed by Yim et al. on Feb. 4, 2009, co-filed herewith.

FIELD OF THE INVENTION

This invention relates generally to wireless multi-hop broadcast networks, and more particularly to broadcasting witness information related to a vehicular environment.

BACKGROUND OF THE INVENTION

Traffic incidents and road conditions impact the safety of drivers, passengers, and vehicles. It is desired to disseminate such road related information to using a multi-hop wireless broadcast network to ensure the safety of the drivers, and passengers and vehicles. This can alleviate traffic congestion, speed up medical rescue and provide real-time data acquisition for law enforcement and insurance purposes.

In traffic incidents, often, multiple vehicles are involved. People may be injured, vehicles damaged, and insurance claims need to be processed. In such situations, evidence and witnesses are necessary to correctly identify fault.

Chen et al., in "Ad Hoc Relay Wireless Networks over moving vehicles on roads," ACM MobiHoc 2001, describe opportunistic and pessimistic forwarding of information. Opportunistic forwarding buffers data messages, and then forwards the messages as soon as possible. Opportunistic forwarding can result in prolonged delays and is more suitable for delay-tolerant applications. Chen et al. do not consider the topology and environment in which the vehicles operate, the content of alert messages, multi-vehicle accidents, and the effectiveness of warning message propagation.

Niculescu et al., in "Trajectory-based Forwarding and its Applications," ACM MobiCom 2003, route messages along a predefined curve. The method is a combination of source routing and Cartesian forwarding. A trajectory for messages is determined by a source node, and other nodes in the network forward messages based on their relationship to the trajectory. Their approach is designed for ad hoc networks, not vehicular networks.

Nekovee et al., in "Reliable & Efficient Information Dissemination in Intermittently Connected Vehicular Ad Hoc Networks," IEEE VTC 2007, describe epidemic protocols for information dissemination. They assume that each vehicle has knowledge of its location using a global positioning system (GPS). Each message contains the location of the source node, i.e., the vehicle, and a direction of propagation. For omni-directional broadcast, a random delay before broadcasting the message is exponentially biased towards vehicles that are further away from the source node. That method improves the speed at which the information is disseminated through the network, but it does not control how much information needs to be disseminated as a function of distance away from the alert source.

Lochert et al., in "Probabilistic Aggregation for Data Dissemination in VANETs," VANET Conference 2007, describe a method for probabilistic aggregation for data dissemination. Their aggregation technique is based on using Flajolet-Martin sketches. The aggregation technique reduces the amount of information required to transmit in the air. However, the accuracy of information is not assured. While their technique can be applied to non-crucial information such as parking space, it cannot be used for safety critical messages.

Eichler et al., in "Strategies for Context-Adaptive Message Dissemination in Vehicular Ad Hoc Networks," IEEE V2VCOM, 2006, describe context-adaptive message dissemination. Each vehicle (node) only forwards a message if it obtains benefits by doing so. Each node considers if it is interest in the information before forwarding the message.

Little et al., in "An Information Propagation Scheme for VANETs," IEEE ITS Conference, 2005, describe a cluster-based method. Clusters are formed continuously regardless of whether accidents have occurred or not. In addition, each cluster designates a cluster head. Data are propagated whenever there is contact of one cluster with another. Cluster headers and trailers are present in each cluster message. Their approach relies on clusters in opposite lane to relay messages. Details on cluster formation, size and membership are not described.

SUMMARY OF THE INVENTION

The embodiments of the invention provide methods for dynamically generating asymmetric zones around an accident site. The method uses information filters and a fusion mechanism to broadcast alert messages across zones. Information regarding potential witnesses is also provided in witness messages.

In one embodiment, the asymmetric relative zones do not assume any absolute location information of vehicles in the zone. Relative zones are based on multiple logical circles centered at the accident site. Another embodiment uses available location information and road topology. Zones are based on actual travel distance of the vehicles to and from an accident site.

The embodiments can also disseminate witness information in witness messages related to the event. This can be done with or without zones. The witness information includes the identity of nearby vehicles, such vehicle identification number, proximity to the event, and times. The proximity is used to identify occupants of the vehicles as primary and secondary witnesses.

DETAILED DESCRIPTION OF THE PREFERRED EMBODIMENTS

Figure 1:
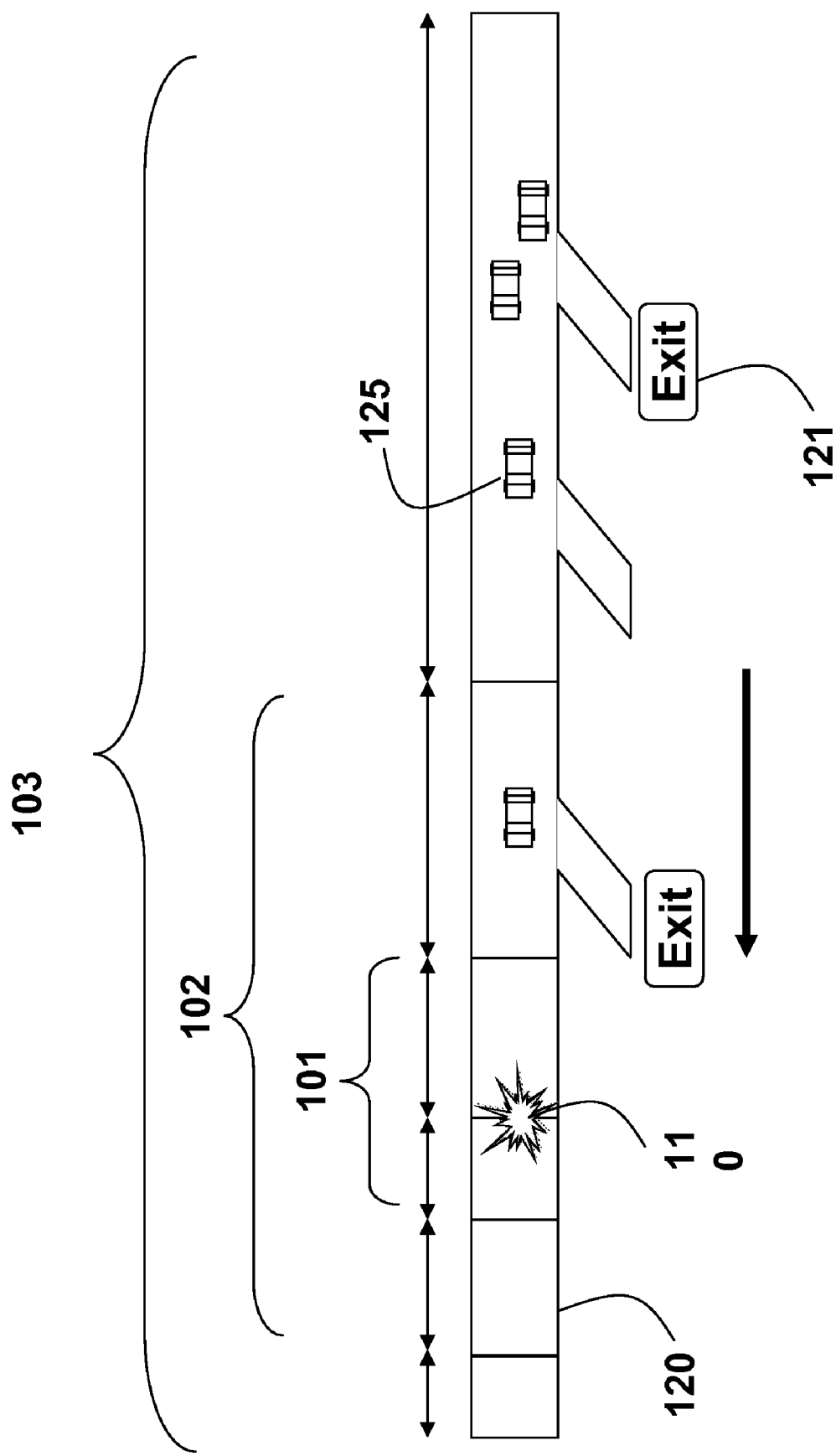
FIG. 1 is a schematic of multiple asymmetric zones and a flow of events according to embodiments of the invention.

Our invention provides a method and system for disseminating road related information using distributed nodes of multi-hop wireless communications network. As defined herein "road related" information is any information that pertains to a vehicular environment, including but not limited to location and identities of vehicles on or near a road, events on or near the road, road condition, weather condition, road infrastructure, entry and exit ramps, witnesses, and the like. This road related information can ensure the safety of drivers, passengers, and vehicles. The events can include accidents, road conditions, and witnesses proximate to the events.

As described herein, nodes include vehicles equipped with transceivers. Logical asymmetric zones are associated with the nodes. When an event, e.g., an accident or hazardous road condition occurs, an alert message is broadcast over the network by a source node (vehicle) sensing the event. Whenever another node receives the alert message, the node determines in which zone the node is, with respect to the node that broadcast the message. This determination can be based on GPS location information and the distance to the broadcasting node. As defined herein, the original broadcaster of the alert message is a source node that senses the event. Relay nodes are the set of nodes that receive the alert message. The set of relay nodes can rebroadcast the alert message to other relay nodes in a manner as described herein.

We define three zones: a red, amber and green zone. It is noted that other zones can be defined, and the naming and number of is arbitrary, as long as there are multiple zones. The zones are disjoint in space, and a smallest zone immediately surrounds the event, and each next larger zone surrounds a previous smaller zone, and so forth. That is the zones are disjoint in space. For a direction of travel, each zone is larger behind the event than in front of the event, i.e., asymmetric. In addition, the zone are preferably longer along the direction of travel, and smaller perpendicular to the direction of travel. That is the zones are designed to approximately conform to the area on and immediately adjacent to the road.

The red zone covers the area immediately ahead and behind of the location of the source node and the event, e.g., the accident site. The red zone is critical because all vehicles in the red zone can be affected by the event, or otherwise involved. For example, occupants in a vehicle ahead of the accident can be potential witnesses.

Some vehicles may need to brake immediately, while others need to slow down, change lanes, or exit the road. Vehicles immediately ahead need to watch for vehicles behind because the accident or hazard may carry forward to impact vehicles ahead. The alert message propagated in the critical zone may contain critical information, such as vehicle identities, location of the hazard/accident and time of the incident. Note that the red zone is asymmetric because vehicles at the back need to give more attention to what is happening ahead. If they do not react in time and take precautions, more accidents or hazards can happen as a result.

The amber zone, which extends outside the critical red zone, is also asymmetric. Vehicles in the amber zone are further away from the accident or hazard site. They are either ahead or behind vehicles in the critical red zone. Although vehicles in the backward amber zone are further away, they do need to take action, i.e., slow down, and take the opportunity to exit the road to avoid further congestion. For vehicles in the forward amber zone, although their traffic flow is not directly affected by the hazard or accident, they too will be notified that an accident or hazard event has occurred. Drivers can then determine how to respond. The alert information present in the amber zone will be less detailed than that for the critical zone. This saves network resources while presenting only the necessary information at each zone. Road related information in the amber zone indicates the time and location of the hazard, along with other information.

The green zone is an extended region of area beyond the amber zone. When a hazard or accident occurs, a large spatial zone of vehicles could be affected. The backward green zone is wider than the forward green zone. Specifically, the backward green zone will cover several road exits, so that vehicles in it can attempt to not only slow down, but also to exit the road.

The availability of possible exits is reflected in the information propagated vehicle-to-vehicle from the critical zone outwards. The choice on possible exits can depend on the drivers concerned. Vehicles in the forward green zone are notified of the incident but these vehicles are further away, and hence, the message is only for informative purposes.

Vehicles in the backward red, amber, and green zones can also be informed to changes lanes to provide rapid access to the accident site by emergency vehicles.

Embodiments of our invention can acquire witness information to be disseminated in witness messages. A witness can be a primary or secondary witness. Primary witnesses are in vehicles that are in close proximity to an accident site. Based on time and locations of these vehicles, relative to the accident vehicles, the vehicles classified and identified as primary witnesses. These location of the vehicles can further be analyzed to be within line-of-sight (LOS), or not (NLOS). LOS refers to the direct visual sightings of the hazard by the drivers concerned. Non-line-of-sight (NLOS) refers to drivers who are in close proximity of the hazard vehicle but are possibly blocked or have an incomplete visual view of the accident. Witness information is stored, propagated in witness messages, and further interpreted. Police vehicles within proximity can obtain the witness information.

Zones

FIG. 1 shows red, amber and green asymmetric zones 101-103 around an event 110 on a road 120 with exits 121 and vehicles (nodes) 125. In FIG. 1, the green zone 103 includes the region covered by zones 102 and 101, however the green zone 103 only contains the region that does not overlap with the amber zone 102.

System Components

Figure 2:
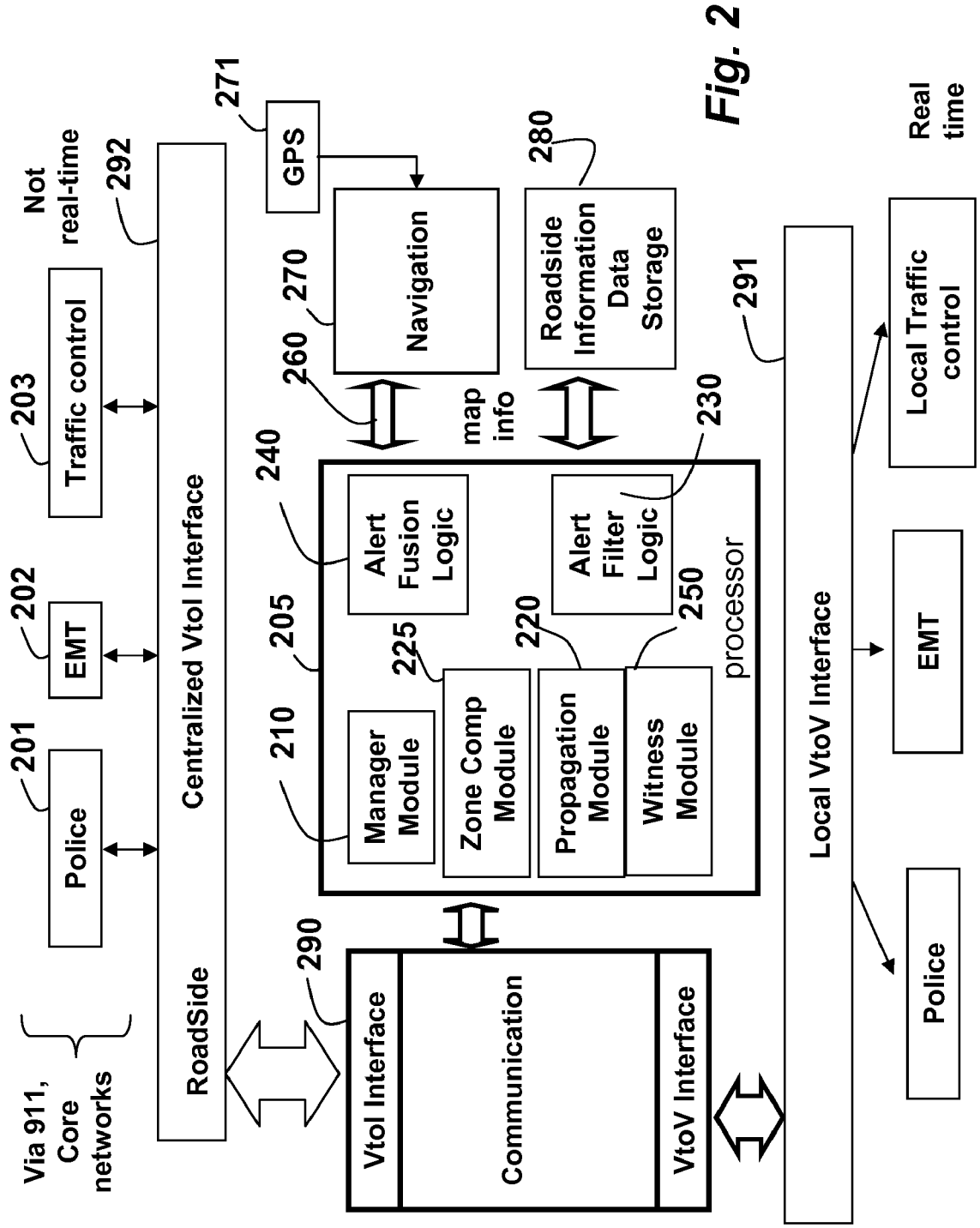
FIG. 2 is a block diagram of a method and system for disseminating road related information according to embodiments of the invention.

FIG. 2 shows system components related to embodiments of the invention.

The major components are a processor 205 for performing the steps of the methods described herein. The processor is connected to a communication module 290, and optional navigation module 270 and a storage module 280. The processor includes a manager module 210, a propagation module 220, a filter module 230, a fusion module 240, a witness module 250, a zone computation module 255. The interfaces 260 connect to the other possible devices, such as the navigation module 270, the storage module 280 for storing the road related information, and the communication module 290.

The virtual zones are generated by the manager module whenever a hazard event 110 occurs. Zones for events on different roads are mutually exclusive. Road related information is only propagated in the zones related to a particular event.

System Architecture

This invention considers a network of nodes, e.g., vehicles. Each node is equipped with the communication module 290 that interfaces with devices that perform vehicle-to-vehicle (V to V) communications 291 and vehicle-to-infrastructure (V to I) communications 292. The infrastructure can include centralized and local (in vehicle) police 201, emergency medical technicians (EMT) 202, and traffic control 203, generally defined as emergency response agencies. The communications to the local infrastructure is in real time.

The navigation module determines location information. For example, location information can be derived from a global positioning system (GPS) signal 271. The navigation module can also have access to topology information, e.g., maps.

The manager module 210 also includes a dissemination module that interfaces with the navigation and communication modules to broadcast and receive road related information as described herein.

The road related information can include any vehicle's location, speed, engine status, and road condition for the vehicle as well as the road related information received from other vehicles.

The propagation module 220 gathers the information for transmission according to the zone as determined by the zone computation module 255, and sends messages to the communication module 290.

Asymmetric Zones

Figure 3:
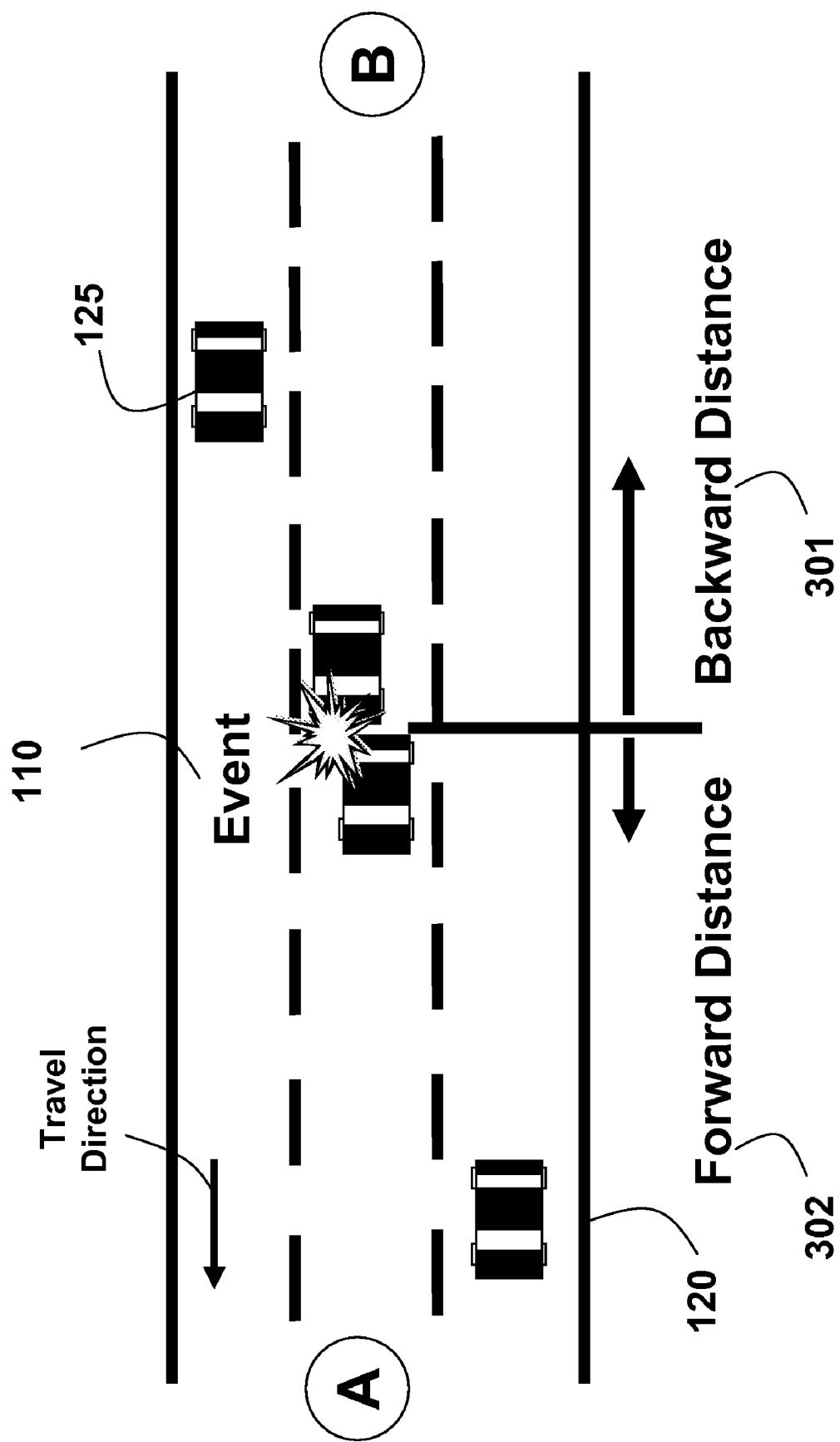
FIG. 3 is a block diagram of forward and backward distance relative to an accident site according to embodiments of the invention.

When an event 110 occurs as shown in FIG. 3, the responses of vehicles approaching the accident site is different from the responses of vehicles leaving the accident site.

The following notation is used to facilitate the description in this invention. Given the road 120 between points A and B, and the event 110 occurs on a segment of the road that is going towards point A, the term backward 301 refers to an area of the road that has vehicles approaching the event travelling towards point A, and the term forward 302 refers to the area of the road that has vehicles going away from the accident site and travelling towards point A. Any segment of the road with vehicles going towards point B is excluded from the definitions.

When the event occurs, multiple zones are generated for communicating the road related information related to the event. The sizes of the forward and backward zones can be different, i.e., asymmetric, because the responses of vehicles that are far away from the event can be different from vehicles that are close to the event.

Figure 4A:
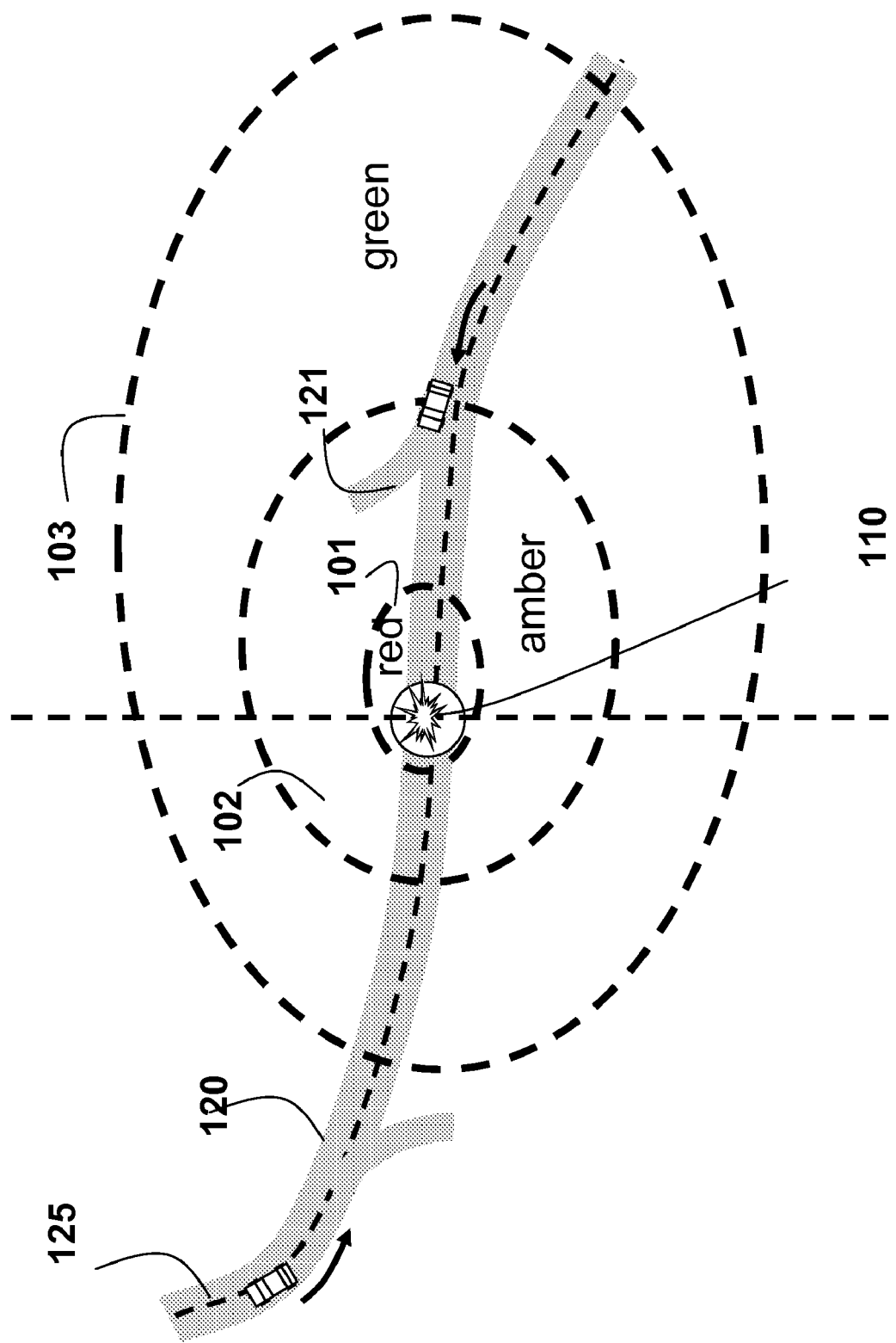
FIG. 4A is a schematic of zones based on radial distances away from the accident site according to embodiments of the invention.

The zones can be generated without local map information by approximately measuring the distance from the vehicle to the event. If maps are available, a scalar numbering system that uniquely identifies locations in the road can be used, to determine zone based on actual distances between the event and the vehicle. There is a one-to-one mapping between the road location and the zone. Table 1 and FIG. 4A indicates approximate sizes of the zones.

TABLE 1

| Zone | Forward Distance | Backward Distance |
|---|---|---|
| Red | $d_{rf} = 150$ m | $d_{rb} = 300$ m |
| Amber | $d_{af} = 1,500$ m | $d_{ab} = 5,000$ m |
| Green | $D_{gf} = 3,000$ m | $d_{gb} = 10,000$ m |

Zones Determination Based on Radial Distance from the Event

Figure 4B:
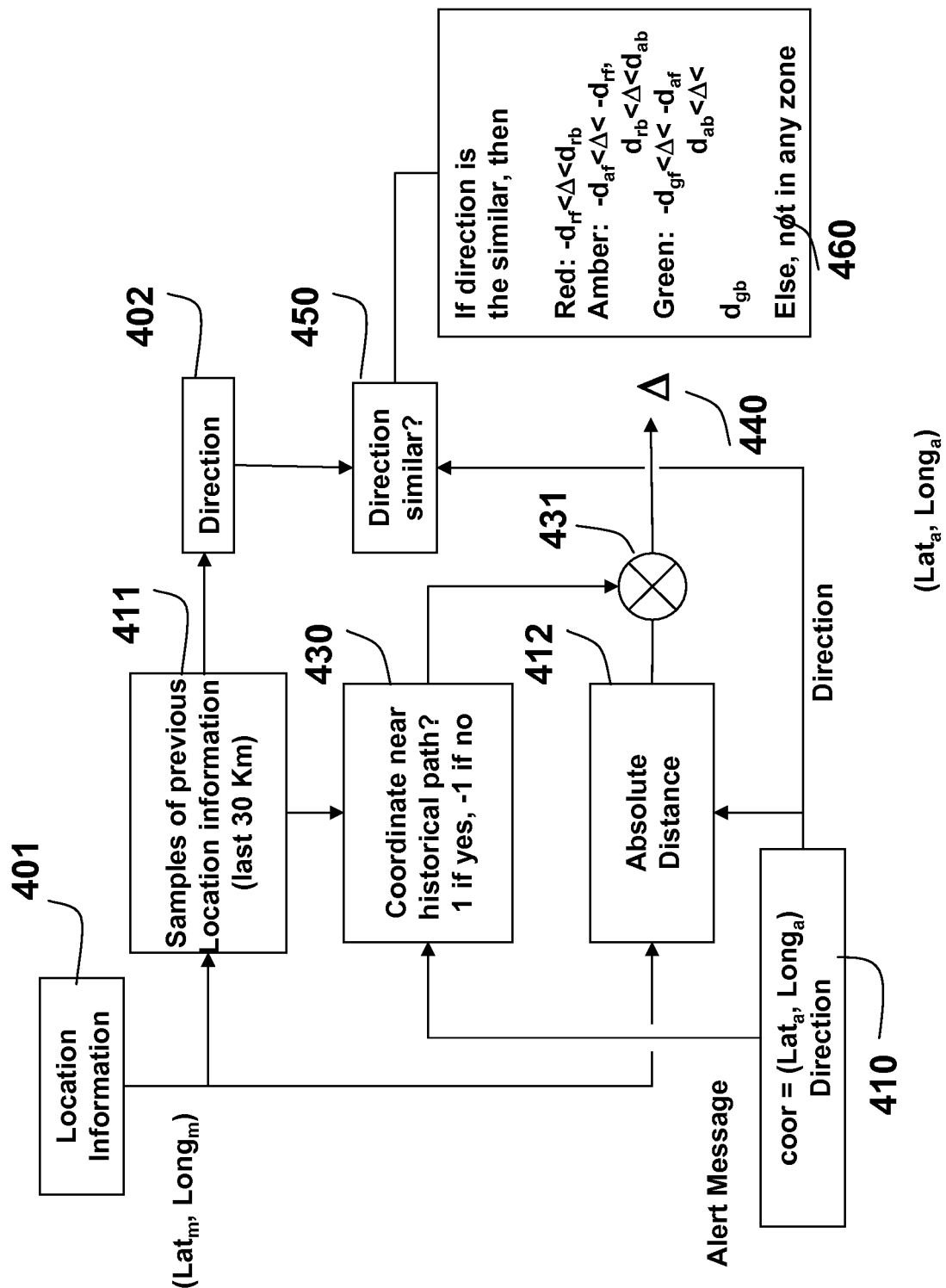
FIG. 4B is a flow diagram for the zones of FIG. 4A according to embodiments of the invention.

As shown in FIG. 4B, the location information 401 related to the event 110 and an approximate direction of traffic where the event has occurred are included in the messages 410. At each vehicle, samples 411 of previous location information 401 are stored, so that the vehicle can determine if the vehicle has already passed the accident site.

The method determines the absolute distance 412 between the coordinates in the alert message 410 and the current location 401 of vehicle. The method also sets 430 a value X=−1 if the coordinate given in the alert message is not near the historical path in the record of the vehicle, i.e., if the vehicle is in the forward zone of the event. Otherwise, the value is X=1. The method multiplies 431 X with the absolute distance 412 to obtain Δ 440, which is used to represent a signed distance relative to the direction of traffic. If the direction 402 of the vehicle is similar 450 to the direction specified in the alert message 410, the system assumes that the vehicle is on the same side of road as the accident site, and the zone information 460 is computed using:

Red zone if $-d_{rf} < \Delta < d_{rb}$;

Amber zone if $-d_{af} < \Delta < -d_{rf}$ or $d_{rb} < \Delta < d_{ab}$; and

Green zone if $-d_{gf} < \Delta < -d_{af}$ or $d_{ab} < \Delta < d_{gb}$, as indicated in Table 1.

Additionally, the vehicle also uses the historical information 411 to estimate the general direction 402 of travel. This direction information, along with the information whether the vehicle has already passed the accident site, can be used to infer whether the vehicle is in the forward or backward zone, and whether the vehicle is on the same side of the road as the accident vehicle.

The location information includes latitude and longitude information. For example, the location information can be the 64-bit GPS signal 171, or a compressed number.

Figure 4C:
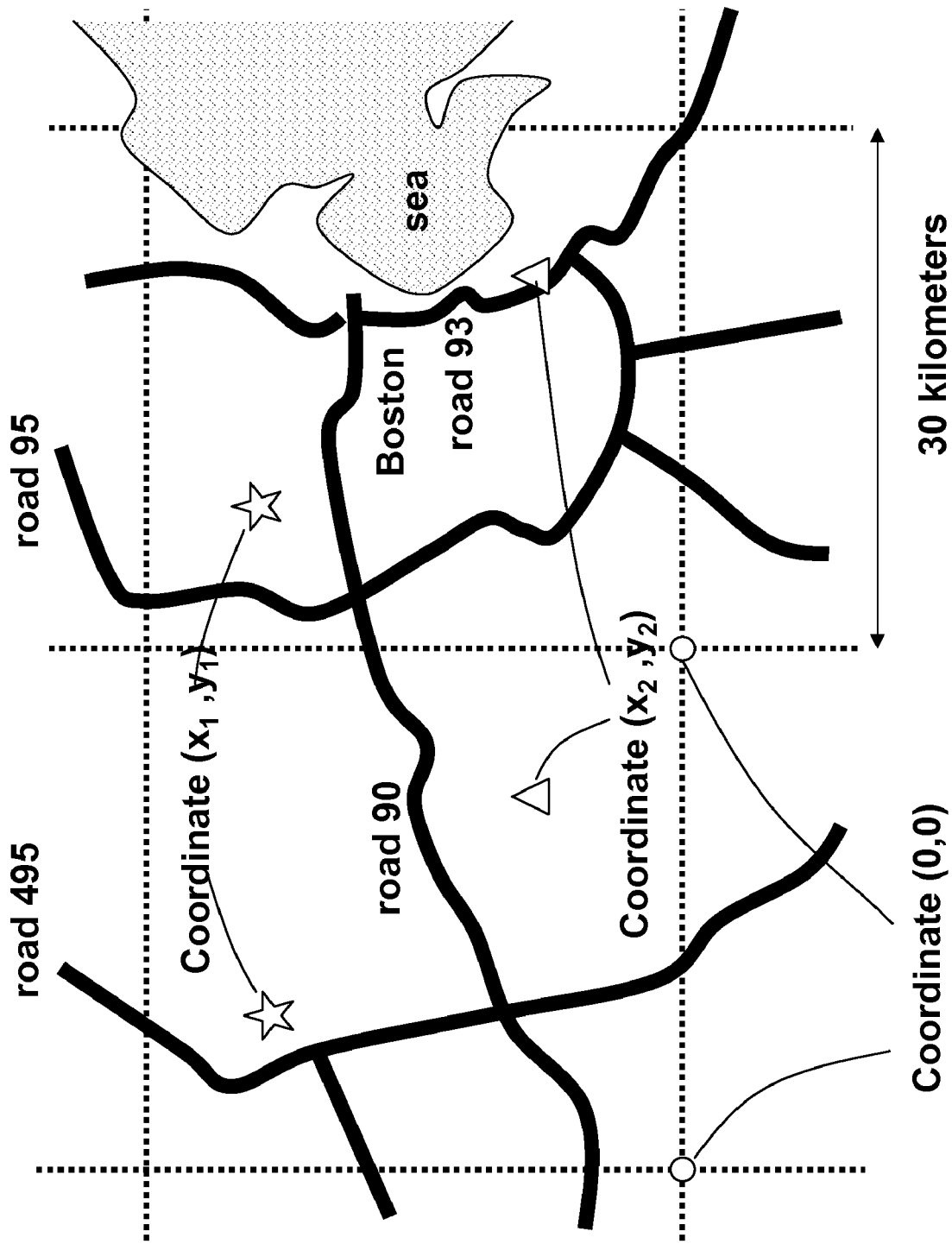
FIG. 4C is a map to show how modulo arithmetic can be used to save the number of bits required to send location information according to embodiments of the invention.

As shown in FIG. 4C, the number of bits can be reduced by using modulo arithmetic. For a local geographical area, the same coordinate can be used to represent two locations that are sufficiently far away. As long as the base of the modulo-arithmetic is at least twice the maximum radial distance for the green zone, the distance is unique. In FIG. 4C, we use the coordinate (0,0) to represented two geographical location that are 30 Km apart. Similarly, coordinates $(x_1, y_1)$ and $(x_2, y_2)$ each represents two different locations. In this example, 32 bits can be used to represent a location with resolution of half a meter.

If a vehicle stores N samples of previous locations corresponding to the last D meters of traveled distance, and $(x_i, y_i)$ are the coordinates of the $i^{th}$ sample, with small indexes referring to location samples that are further back in the history 411. Then, for every pair of location samples j>i, the angular degree of every pair of location samples relative to the absolute eastern direction using $$\theta_{ij} = mod_{2\pi}\left[\arctan\left(\frac{y_j - y_i}{x_j - x_i}\right) + I(x_j - x_i < 0)\pi\right],$$

where $mod_{2\pi}[.]$ is the modulo-$2\pi$ function, $I(.)$ is an indicator function that equals to 1 if (.) is true, and equals to 0 if (.) is false, and the arctan function has a range between $-\pi/2$ to $\pi/2$. The average direction $\bar{\theta}$ is $$\bar{\theta} = \frac{2}{N(N-1)}\sum_{i=1}^{N-1}\sum_{j=i+1}^{N}\theta_{ij}.$$

The representation of average direction in terms of bits can be done via Grey code, or other codes. The average directions can be compared for multiple vehicles to determine is their direction of traveling is similar, i.e., on the same road heading in the same direction.

Figure 4D:
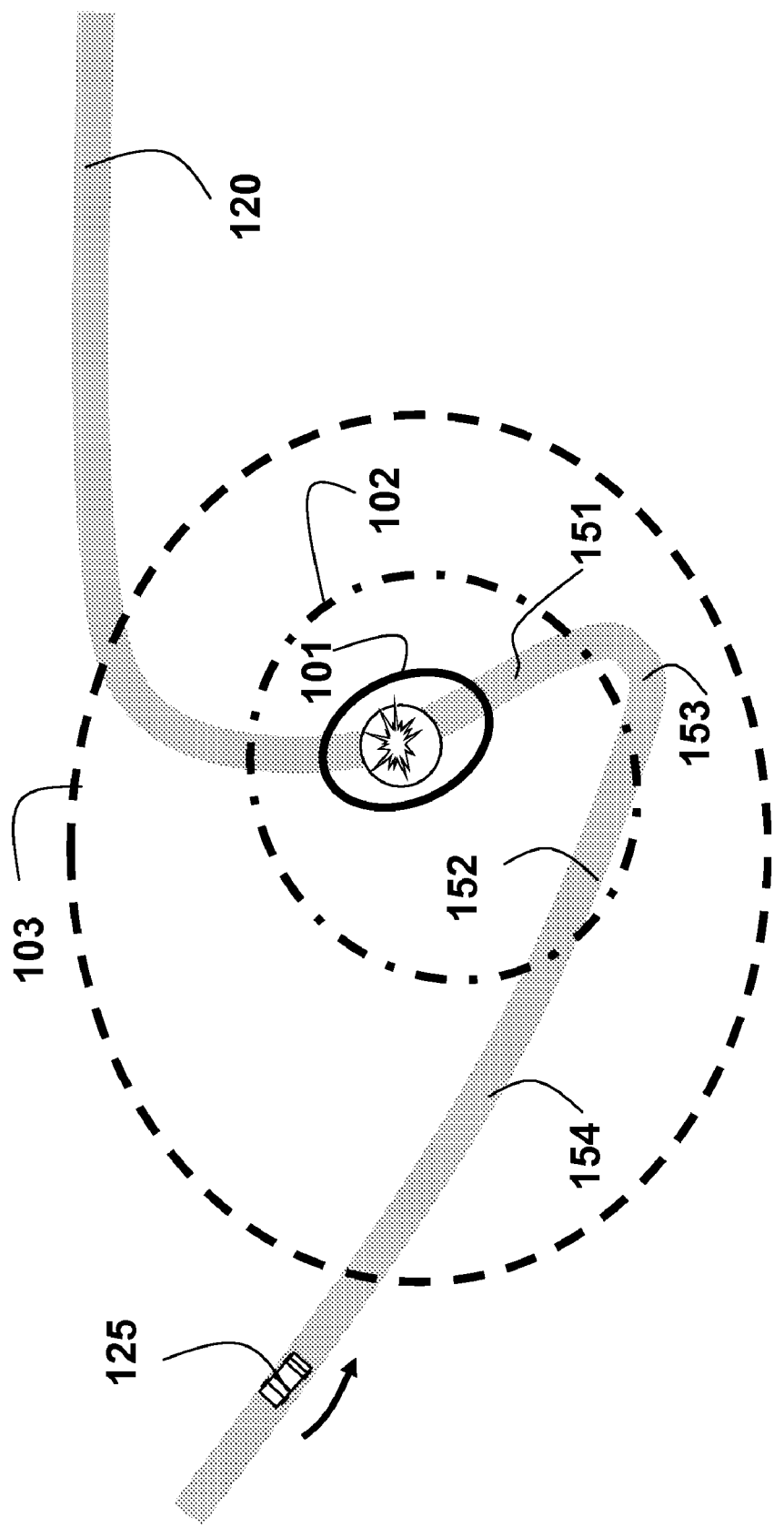
FIG. 4D is a schematic of zones with multiple non-contiguous sections according to embodiments of the invention.

Zone generated using the radial distance can lead to zone splitting if the road is sharply curved, which is demonstrated in FIG. 4D. In the figure, the backward amber zone covers two non-contiguous segments 151-152 of the road, so is the backward green zone 153-154. This is because the section of the road 152 between the two amber zones is beyond the distance range defined for the amber zone 102. This does not lead to any major problems because the zone that is further away from the event, in terms of travel distance, is at least distance $d_{ab}$ away. The road related information for the green zone is sufficient for vehicles in this segment of the road. For vehicles in this segment 152, if they receive message intended for the amber zone, then they forward the message.

Method Based on Actual Traveled Distance from the Alert Source

When the knowledge of local map information is available, zones can be generated based on the actual traveled distance on the road from the source of the alert message. A location on the road is defined by the road number (e.g., I-95), and the distance between an absolute reference point and the location in terms of actual traveled distance on the road. As a convention, we select the absolute reference points at the west-most and south-most ends of the roads, and the distance increases as the road extends eastward or northward.

Figure 5A:
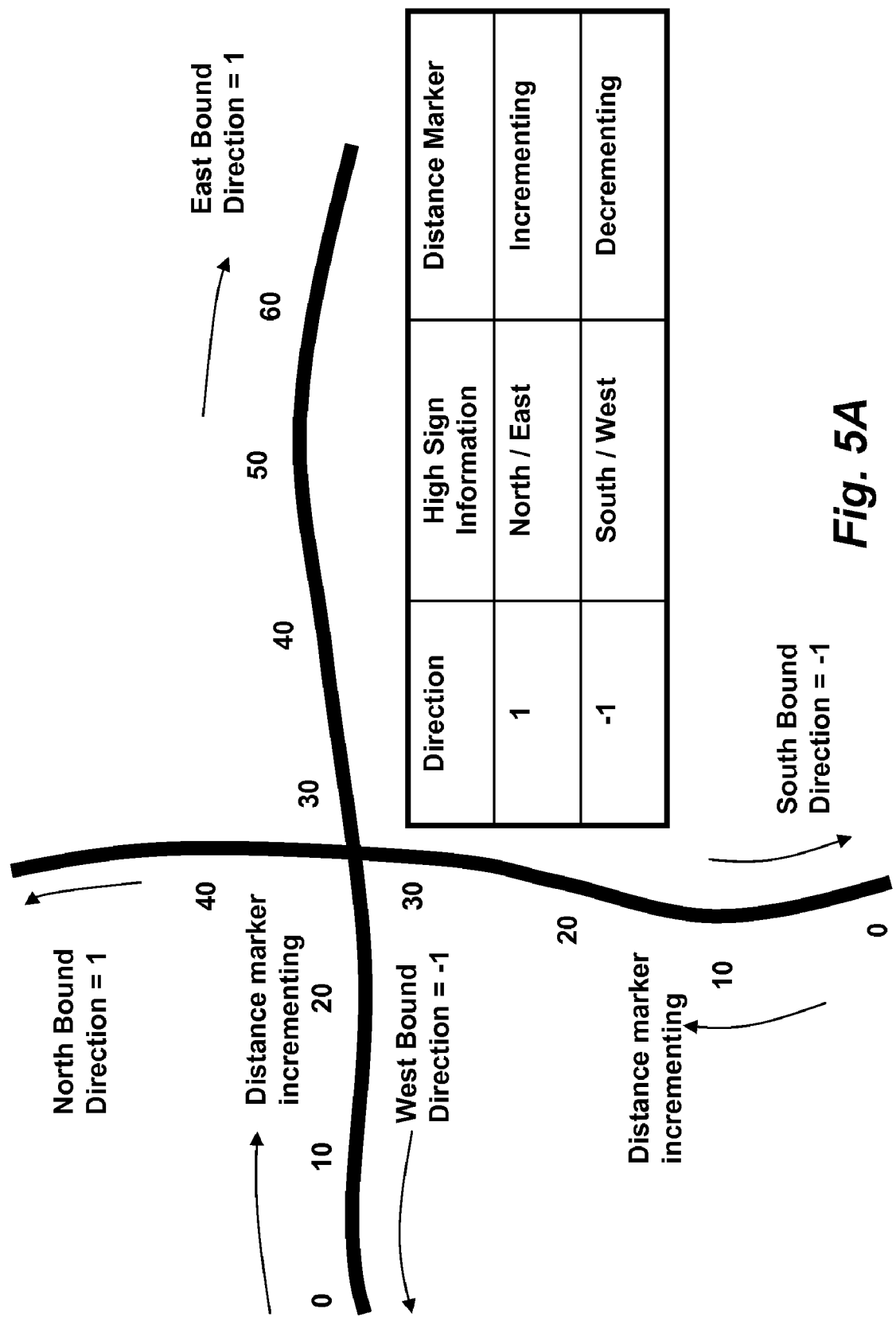
FIG. 5A is a map with road distance markers according to embodiments of the invention.

FIG. 5A shows an example of our convention. The direction of vehicles traveling on the road can be set to reflect whether the distance away from an absolute reference, i.e., a distance marker, are increasing in value. Hence, north-bound and east-bound traffic have a direction value of 1, and south-bound and west-bound traffic have a direction value of $-1$.

Figure 5B:
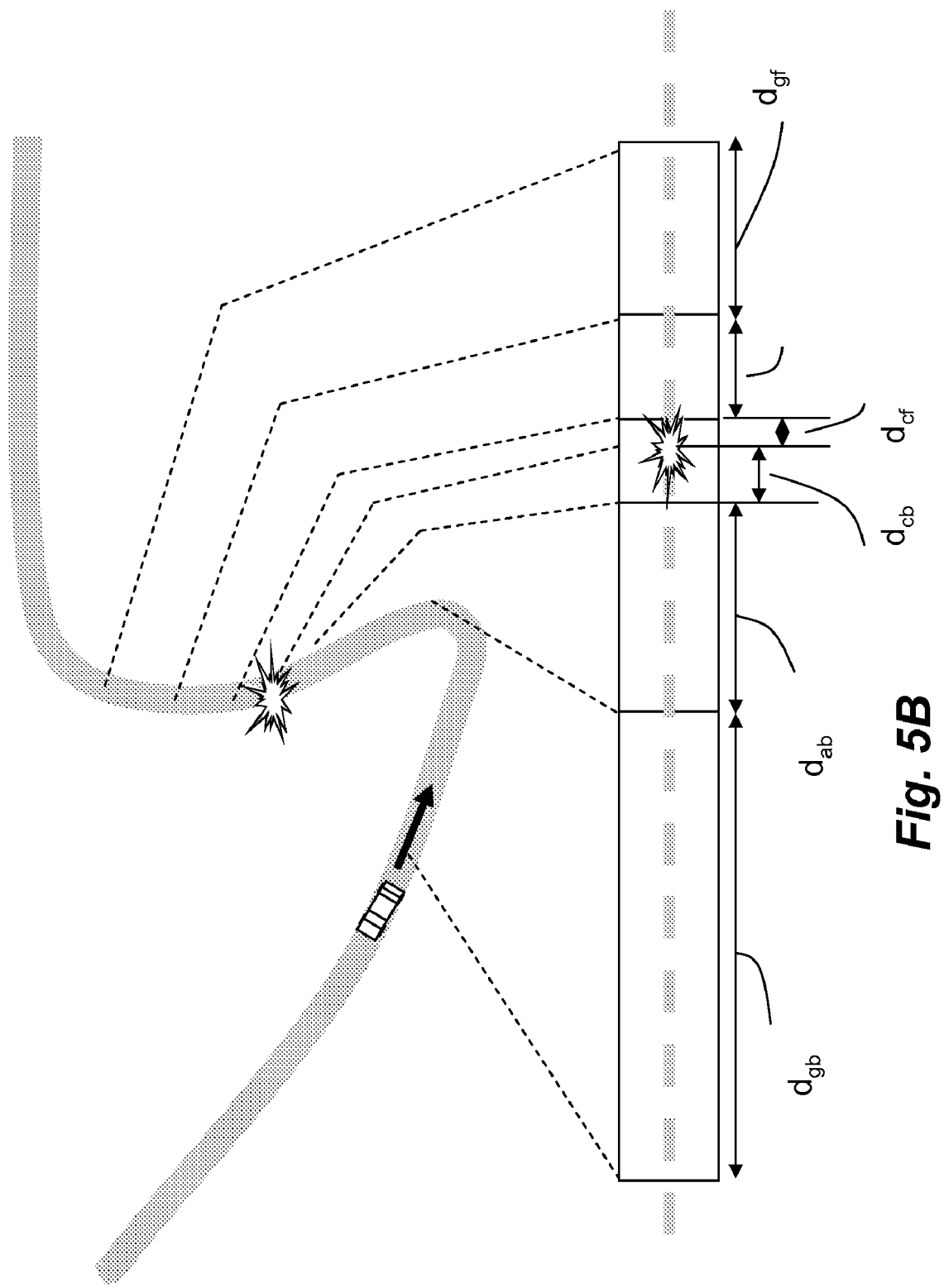
FIG. 5B shows an example of zones that are derived using the method based on road distance markers.

FIG. 5B shows the zones for FIG. 4D using the labeling convention of Table 1. Because the zone is defined by the actual traveled distance, the zone splitting phenomenon does not occur regardless of how the road curves.

Figure 5C:
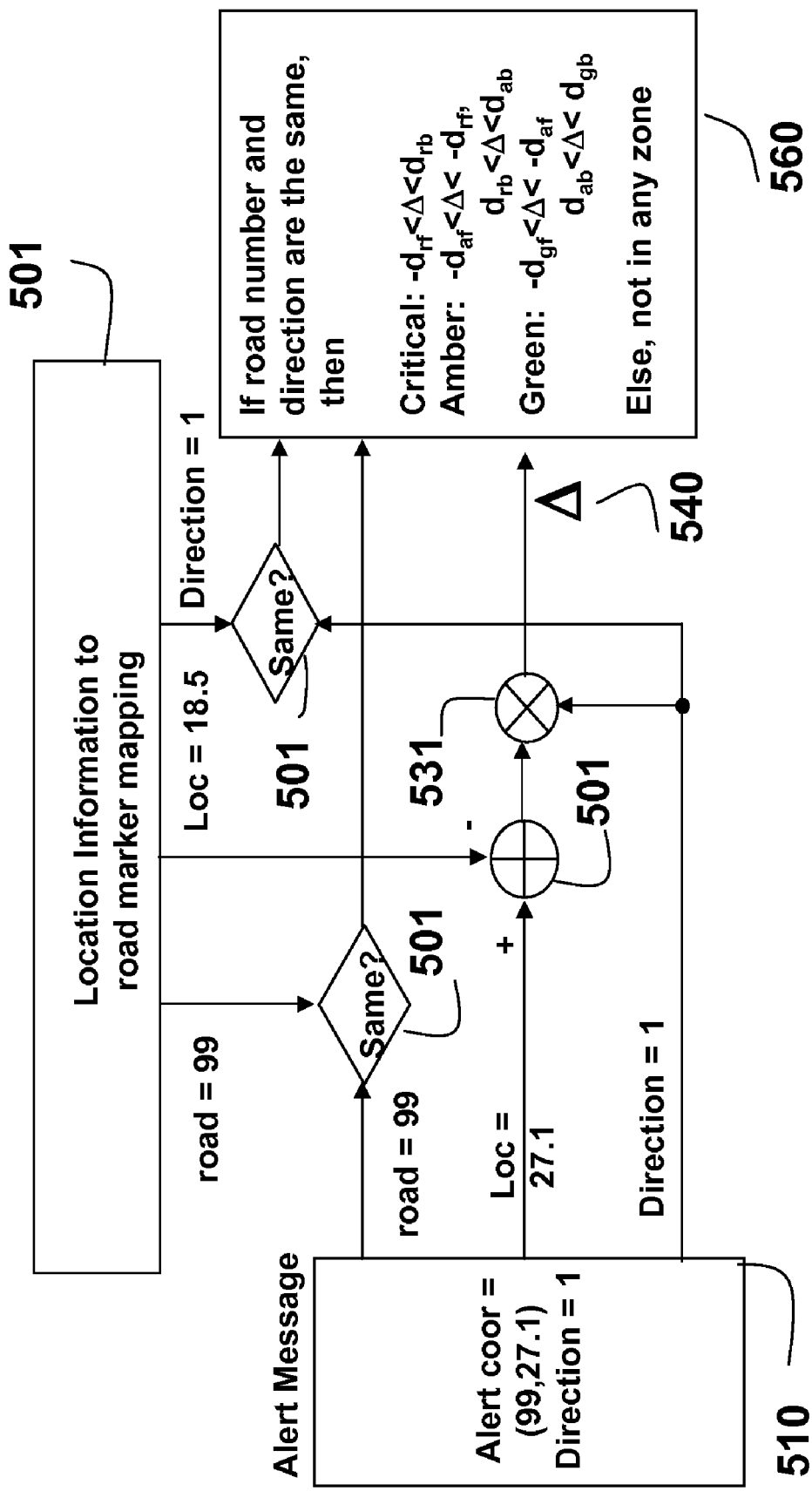
FIG. 5C is a flow diagram of zones generating according to embodiments of the invention.

As shown in FIG. 5C, the zone computation is performed in a distributed manner. The road number, distance marker at the event, and direction of a vehicle in accident are included in the message 510. When a vehicle receives the message, the vehicle first checks 501 whether its road number and direction matches the information in the message. If the information does not match, then the vehicle is not in any zone. Otherwise, its own distance marker value is subtracted 502 from the distance marker value shown in the message. Furthermore, the calculated value is multiplied 531 by 1 if the direction is north-bound or east-bound, or by $-1$ if the direction is south-bound or west-bound. We use the symbol $\Delta$ 540 to represent the resulting value. The zone is set 560 according to:

Red zone if $-d_{rf} < \Delta < d_{rb}$;

Amber zone if $-d_{af} < \Delta < -d_{rf}$ or $d_{rb} < \Delta < d_{ab}$; and

Green zone if $-d_{gf} < \Delta < -d_{af}$ or $d_{ab} < \Delta < d_{gb}$.

Multi-Alerts Scoped Broadcast

When an event occurs, the execution of the method can be triggered similarly to the airbag signal. Therefore, for vehicle-to-vehicle collisions, multiple messages are broadcasted, and rebroadcasted. The alert message includes an identity of the vehicle involved in the event. Thus, other vehicles can determine that the two messages refer to the same event, and the filter and fusion modules can be applied. In addition to these two messages, primary witness messages can also be broadcast.

Figure 6A:
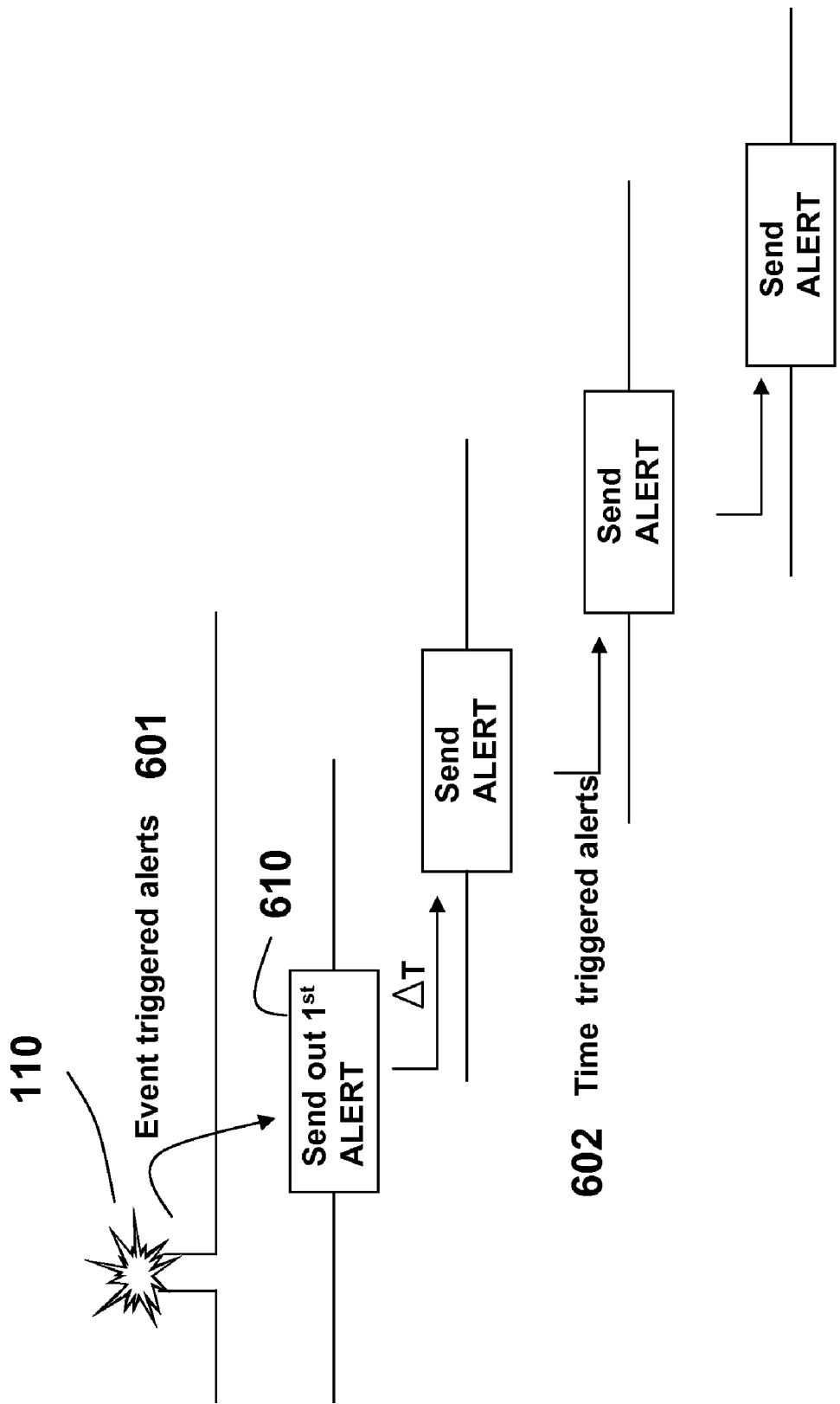
FIG. 6A is a schematic of event triggered alerts and time triggered alerts according to embodiments of the invention.

As shown in FIG. 6A, alert messages 610 can be event triggered 601 and time triggered 602. A back-off timer can be applied to the periodic message to minimize the probability of alert message collision.

Figure 6B:
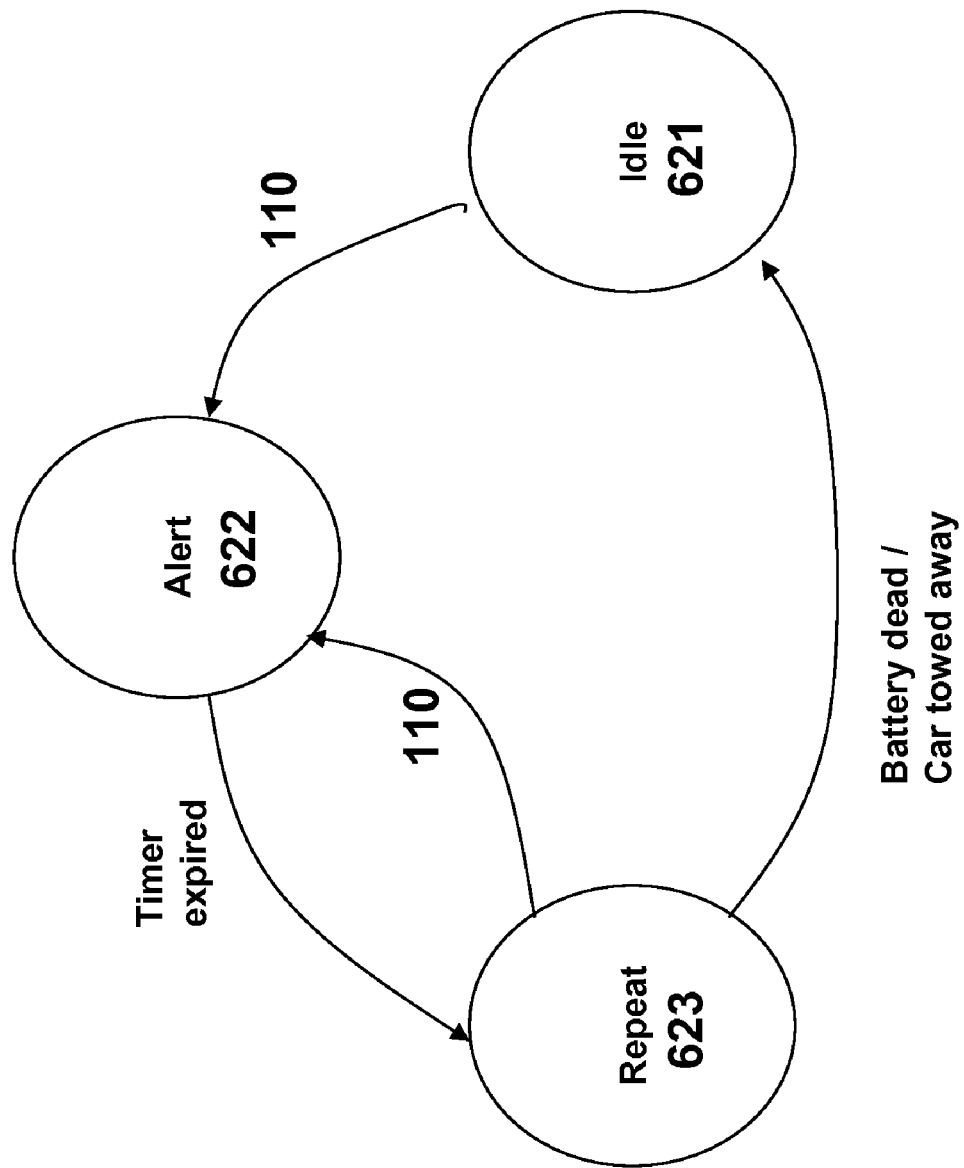
FIG. 6B is a state diagram for event triggered alert and periodic alerts according to embodiments of the invention.

As show in FIG. 6B, the method includes three states. Initially, each vehicle is in an idle state 621. When the event occurs, the vehicle transits to an alert state 622 and broadcasts the message. After a timer expires, the vehicle transits from the alert state to a repeat state 623, and periodically broadcast the warning messages, until the event is resolved.

Multi-Vehicle Accidents

Multi-vehicle accidents are complex because it is difficult to pinpoint who is at fault. The chain of events can be quick and catastrophic. Our invention can acquire witness information related to multiple related events.

When vehicles collide, multiple messages are broadcast identifying the vehicles. Information regarding the vehicles can be transmitted using the bodies in contact as the broadcasting medium. Another approach traces the time and locations of the vehicles.

For each event, the zones are generated and messages are broadcast to warn other vehicles, and provide witness information. At times, an accident can result in another subsequent accident with different vehicles. Therefore, accidents that are inter-related can be identified through the information fusion technique described for this embodiment.

Witness Identification Methods

Two methods are described herein to identify primary and secondary witnesses. It is noted that theses method can operate with our without the zones as described above. Distance from accident site and visual line-of-line (LOS) criteria are used to determine if occupants of the vehicles are primary or secondary witnesses.

Figure 7A:
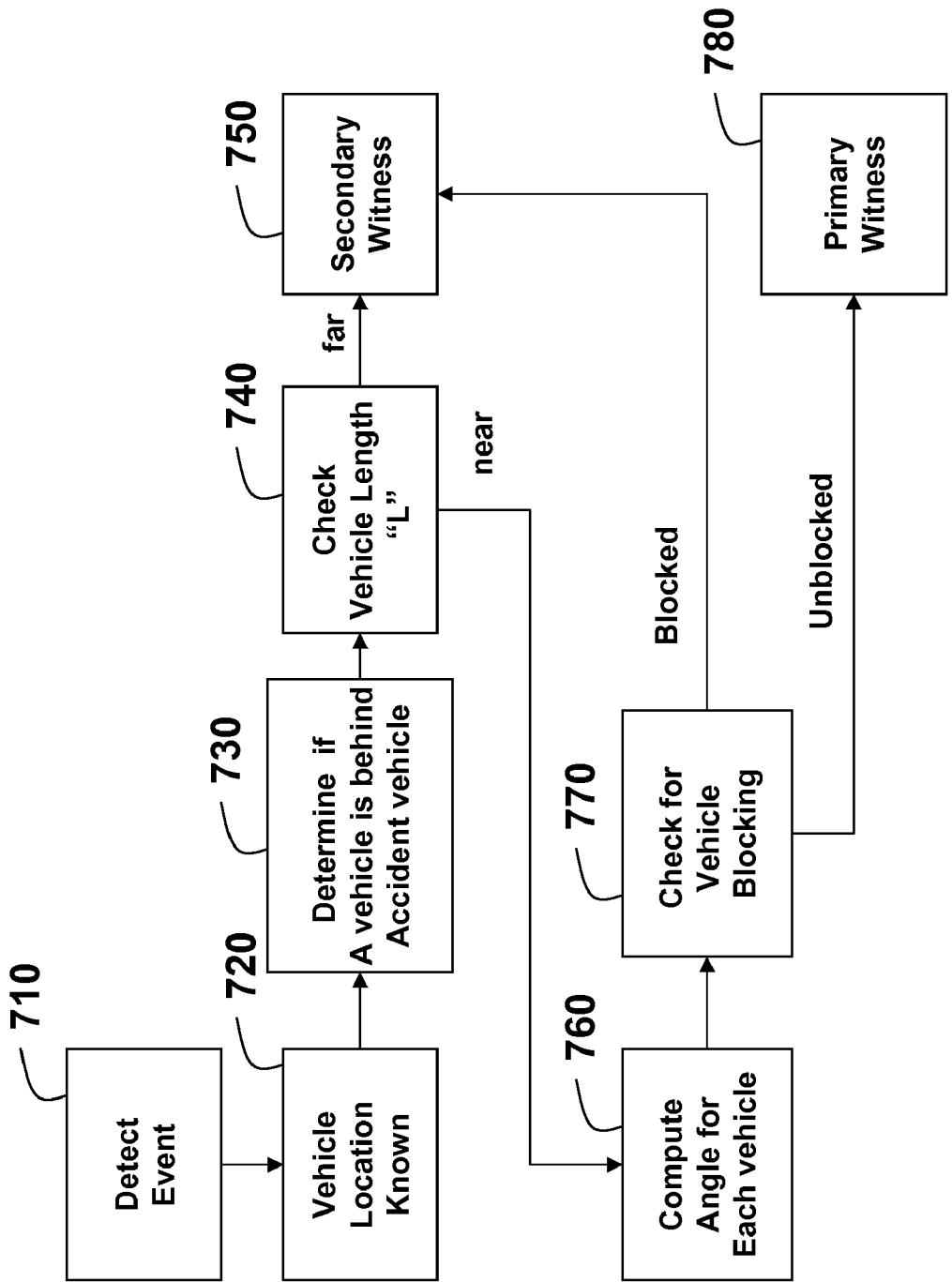
FIG. 7A is a block diagram of a witness identification method using a known location of an accident vehicle and locations of adjacent vehicles.

One method uses the location and time information of the accident vehicles and neighboring vehicles. FIG. 7A presents a high-level procedure for identifying primary and secondary witness. As used herein witnesses are likely to occupy vehicles that received the alert message, and that are within a predetermined distance of the source node, and possibly can have observed the event. Herein, witness and witness vehicle are used interchangeably. It is assumed a Vehicle identification number (VIN) is sufficient to identify and lead to witnesses.

Witness information in witness messages includes primary and secondary witness status, location of witness node, location of source node, and time when the information was generated.

When the event occurs, the message including the vehicle ID, time, and location information are broadcast. In response to receiving the message, neighboring vehicles perform a witness state procedure to determine whether the vehicle is a primary or secondary witness. It is noted that the witness state can change as the vehicle moves relative to the accident vehicle. After the vehicle identifies itself as a witness to an accident, the vehicle can upload relevant data related to the accident to a law enforcement agency when the vehicle approaches a stationary roadside unit equipped with a transceiver node, or distribute information to other nearby vehicles for establishing collective intelligence around the accident site.

The method uses the accident vehicle as an "anchor," and considers only vehicles behind the accident vehicle as possible witnesses. In addition, primary witnesses are vehicles that are less than "Q" vehicle lengths from the accident vehicle, else the vehicles are considered as secondary witness. Among the primary witnesses, we differentiate which are within LOS of the accident vehicle and which vehicle is directly behind the accident vehicle.

Figure 7B:
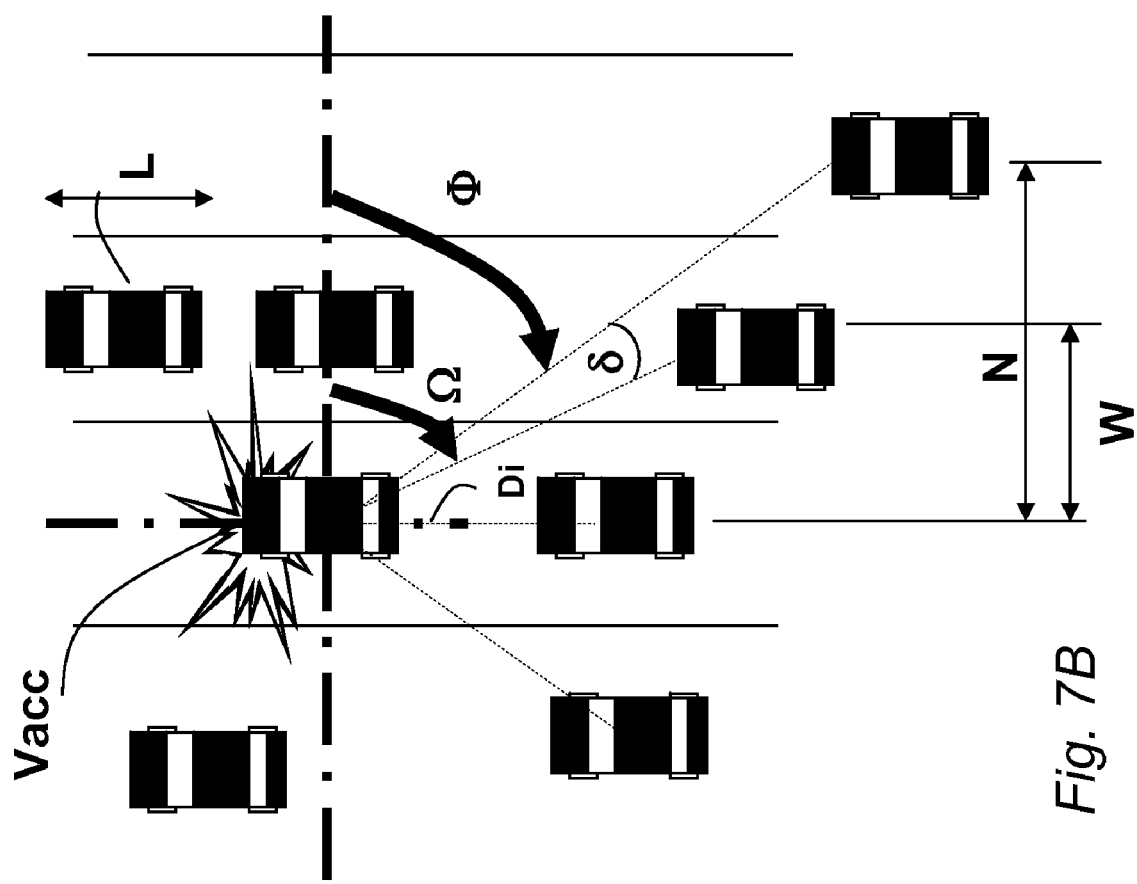
FIG. 7B is a schematic for witness identification according to embodiments of the invention.

FIG. 7B shows the variables used by the procedure of FIG. 7A. Our procedure determines a shortest distance (Di) to the event, i.e., Vacc, based on the location contained in the message. The procedure uses various angles Ω, Φ, δ between the vehicle involved in the event other vehicles behind the event. The angles can be determined by various means, e.g., GPS or a grid described below. The procedure also average length L of the vehicles, the width W of the lanes, and the number N of lanes. These variables, in combination, can be used whether the view of the event is blocked or not. For, example, occupants in vehicles in other lanes may have a better view than those in vehicles two or three vehicles behind.

The node in a vehicle detects the event 110. The location of the vehicle is known 720 using the navigation module 270. A vehicle determines 730 if it is behind a vehicle involved in the event. The vehicle length L is determined 740. If the vehicle is far behind the event, the vehicle is considered a secondary witness 750. Otherwise, determine 760 the angle various angles, and check 770 for blocking. If the LOS is blocked, then the vehicle is a secondary witness, and otherwise a primary witness.

Although the above procedure is executed after a vehicle first receives the alert message, the procedure does not exclude multiple executions upon receiving additional alert messages sent by the same source.

Virtual Grid Method

Figure 8A:
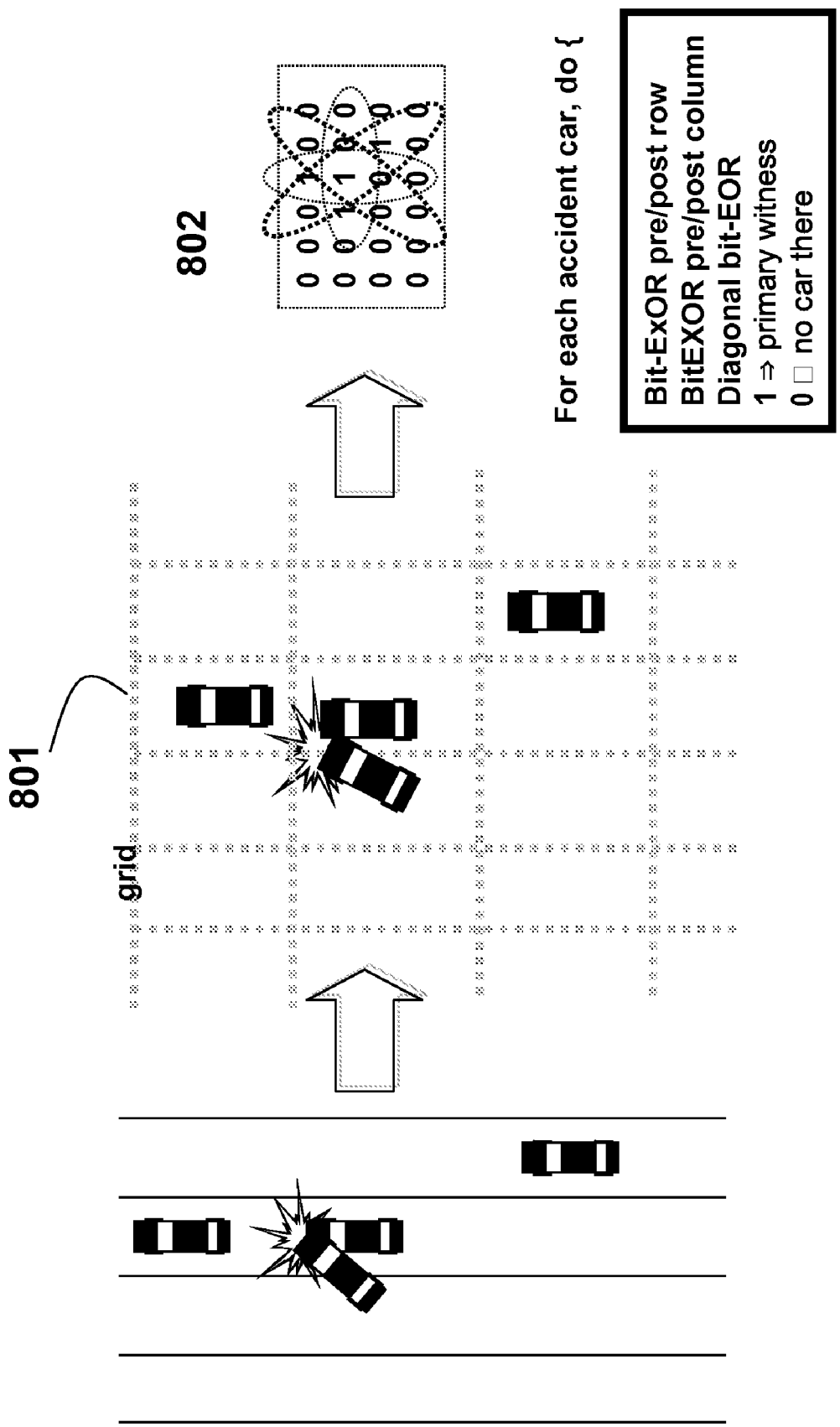
FIG. 8A is a schematic of snapshot in witness identification according to an embodiment of the invention.

If vehicles within the red zone all know the locations of other vehicles, then a zone-based topology can be derived. By knowing location topologies of all vehicles in the red zone, each vehicle can process the presence or absence of other vehicles in each block of a virtual grid as shown in FIG. 8A.

The virtual spatial grid 801 is superimposed on road and covers the red zone. This grid is variable in size and normally the size of each block in the grid is the average size of vehicles. The presence of a vehicle in the virtual spatial grid 801 is represented by a "1" in a corresponding array of bits 802. The bit is "0" otherwise.

Figure 8B:
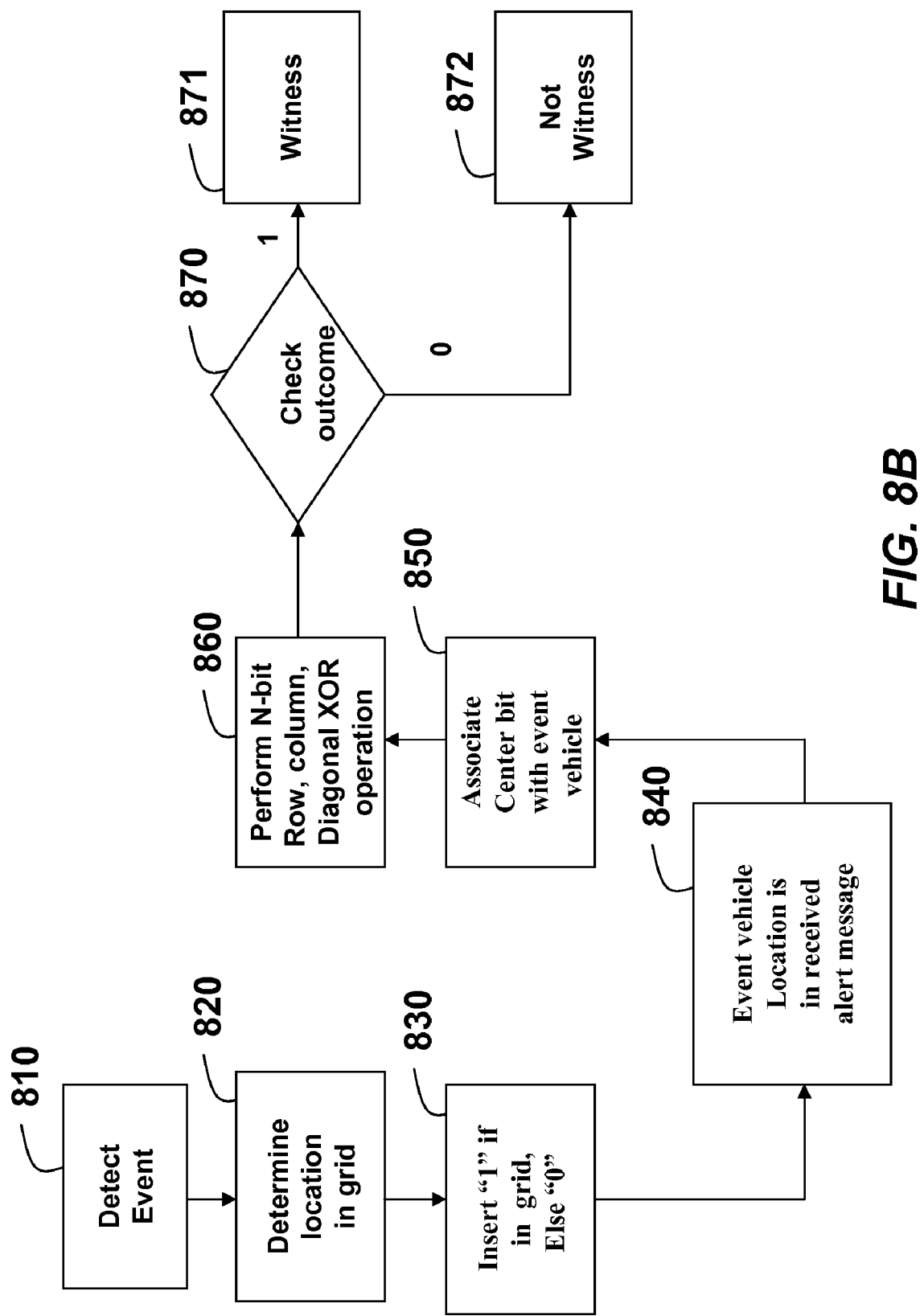
FIG. 8B is block diagram of a witness identification method using a virtual grid and exclusive OR operations.

FIG. 8B shows the procedure for checking if vehicles have potential witnesses or not of a detected 810 event. For each vehicle in the red zone, the following procedure is performed:

The vehicle determines 820 the corresponding location relative to the virtual grid 802. If 830 the vehicle is in the grid, insert "1," otherwise insert "0." The location the vehicle involved in the event is received 840. The center bit in the grid is associated with the event vehicle. An exclusive-OR (XOR) operation is performed 850 on all rows, columns and diagonals in the grid. The outcome of the XOR operation is checked 870, and if "1" the vehicle includes a witness 871, and not a witness 872 is a "0."

This procedure enables us to determine the primary and secondary witnesses. These witnesses are determined by each vehicle as soon as the vehicle receives the alert message concerning the event. The bit XOR operations can be expanded from 2-bit distance to 3-bit distance, and so on, depending on the area of coverage for considering vehicles as "witnesses."

For cases where the size of the vehicle overlaps several grid locations, thereby yielding multiple "1"s, i.e., multiple witnesses for the same vehicle, this can be resolved by later checking for witnesses that refer to the same vehicle ID. Hence, such duplication of witnesses can be resolved.

Information Element

The following information elements or fields are relevant to alert messages in different zones. The elements can include: Zone Type, Vehicle Lane, Number of Lanes Open, Travel Direction, Last Exit, Event Vehicles, Event Location, Closest Alert Vehicle, Relay Location, Alert Time, Latest Event, Event Vehicle ID, Witness ID, and Event Level.

Information Filtering and Fusion

Some road related information, such as witness vehicle IDs, is useful in the red zone, but not necessarily useful in other zones. Therefore, we filter the information. Filtering information means some of the information is selectively deleted.

Furthermore, some information from different messages can be combined by "fusion." Fusing information means that information from multiple messages is combined and filtered. For example, in zones that are far away from the accident site, the individual lane number of vehicles in accident is unimportant, but which lanes remain open after the accident is.

The following table lists some information elements that are fused and filtered in between zones. The letter labels refer to a fusion process, and the filtered elements are specified by the word "filtered" in Table 2.

TABLE 2

| Red Zone | Amber Zone | Green Zone |
| --- | --- | --- |
| Estimate Number Vehicles (A) | Estimate Number Vehicles (B) | Event Level (D) |
| Vehicle Lane | Lanes Remained Open (C) | |
| Last Road Exit Direction | Last Road Exit Direction | Last Road Exit Direction |
| Alert Source Location | Closest Alert Source Location (E) | Closest Alert Source Location |
| Event Time | Latest Alert Time (F) | Filtered |
| Witness Vehicle ID | Filtered | Filtered |
| Event Vehicle ID | Filtered | Filtered |

Fusion Process A

The vehicles involved in the event, or nearby vehicles in the red zone receives the vehicle IDs in the red zone messages. These vehicles count the number of unique vehicle IDs the vehicles have received since the beginning of the event, and report the count as the estimated number of vehicles involved in the event.

Fusion Process B

Vehicles in the amber zone receive the estimated number of accident vehicles from either a received red zone or amber zone messages. The vehicles relay the largest estimated number of accident vehicles since the beginning of the accident.

Fusion Process C

The lanes that remain open can be obtained by a negative AND (NAND) operation of all the reported vehicle lanes of the event vehicles. For example, three vehicles are involved in an event on a four lane road, with respective lane location 0b000001 (lane 1), 0b000010 (lane 2), and 0b000110 (lanes 2 and 3), then the NAND operation of these locations yield 0b111000 (lanes 4, 5 and 6 are highlighted). Because there are only four lanes in the road, the vehicle knows that lanes 5 and 6 do not exist. Hence, only lane four remains open after the accident.

Fusion Process D

The event level is based on the received open lanes information and the number of vehicles involved. The level is "00" if the event involves at most two vehicles and at most 1 lane, "01" if the event involves three or more vehicles and at most 1 lane, "10" if the event involves more than one lane, but at least one lane remains open, and "11" if all lanes are blocked. All lanes are blocked can be found when the number of zeros in "Lanes Remained Open" field is equal to the number of lanes in the road.

Fusion Process E

When multiple alert source locations are received by a vehicle in the amber zone, that vehicle relays only the closest alert source location. That is, if a vehicle is behind an accident site, the vehicle reports the accident location that is furthest back in a possible chain of events; on the other hand, if a vehicle is in front of an accident site, the vehicle reports the event location that is furthest ahead in a possible chain of events.

Fusion Process F

When multiple alert times are received by a vehicle in the amber zone, the vehicle relays only the latest time in a possible chain of events.

Instead of filtering witness vehicle ID at the amber zone, it is also possible to ensure a minimal set of vehicles to receive the information regarding witnesses before the information is filtered. Here, each vehicle computes if it is a possible witness to the event. If so, the vehicle stores a copy of that information, and also appends this information into the alert message to be rebroadcast.

While two methods of determining witnesses are described, witness status derivation can involve vehicles in any zone. In addition to this condition, the number of witnesses stored can also be used to quantify how many witnesses are considered sufficient. For example, after five separate witnesses have been identified, the process could terminate. Hence, the number of witnesses recorded can be used to limit the number of vehicles performing witness computation and witness propagation.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

I claim:

1. A method for broadcasting witness information related to a vehicular environment using a multi-hop broadcast network of nodes, and wherein the nodes include a source node and a set of relay nodes in a plurality of zones, wherein each node includes a transceiver and a processor for performing steps of the method, and wherein the vehicular environment includes a plurality of vehicles, and wherein each vehicle is equipped with one of the nodes, comprising the steps of:

sensing an event at a location in the vehicular environment by the source node;

broadcasting, in response sensing the event, an alert message including the location of the event by the source node;

receiving the alert message in the set of relay nodes in the plurality of zones;

rebroadcasting the alert message by selected relay nodes selected by the distance to the event, and further comprising:

receiving the alert message and broadcasting witness messages by the selected relay nodes in response to receiving the alert message, wherein each witness message includes witness information related to the event, wherein the witness information depends on angles between the selected relay nodes and the source node with respect to a direction of travel of the vehicles, and vehicle identification number of the selected relay nodes.

2. The method of claim 1, wherein the witness information includes primary and secondary witness information.

3. The method of claim 1, wherein the witness information includes location information.

4. The method of claim 2, wherein the primary witness information is from the nodes within line of sight of the event.

5. The method of claim 1, wherein the witness information depends on a distance to the event.

6. The method of claim 3, wherein the locations of the nodes are stored as a "1" bit in a bit map grid, wherein a center bit in the grid corresponds to the location of the source node, and further comprising:

applying an exclusive OR to the bits in rows, columns and diagonals of the grid, and if the exclusive OR produces a "1" bit the corresponding node is in one of the vehicles occupied by a potential witness.

7. The method of claim 1, wherein the alert message includes fields for a location of the vehicle, a vehicle lane, a number of lanes open, a travel direction, a last exit, and a time of the event.

8. The method of claim 1, wherein the alert message is filtered.

9. The method of claim 1, wherein the alert message is fused with other alert message.

10. The method of claim 1, further comprising:

receiving the alert message and the witness messages in a stationary roadside unit equipped with one of the nodes.

11. The method of claim 10 wherein the stationary roadside unit relates the alert and witness messages to an emergency response agency.

* * * * *